No. 833,747. PATENTED OCT. 23, 1906.
W. L. MARSH.
PASTE APPLYING APPARATUS.
APPLICATION FILED MAR. 31, 1906.
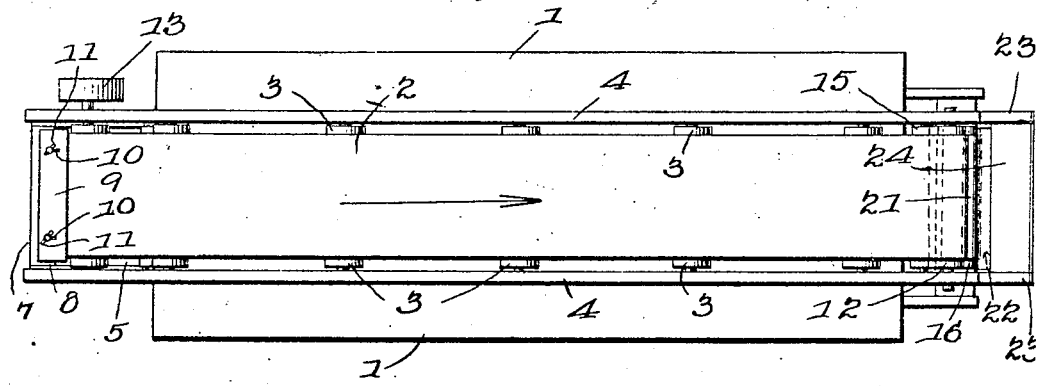
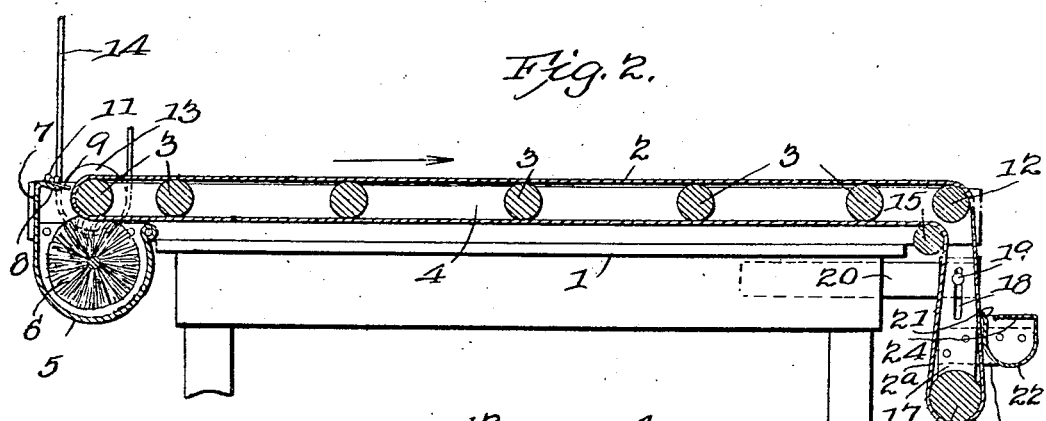
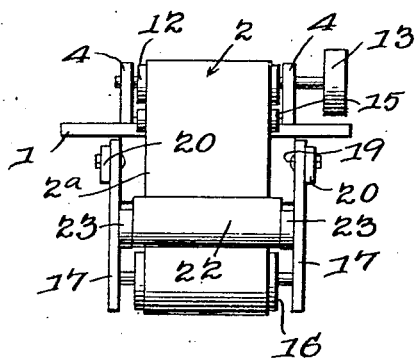
WITNESSES:
*Willis L. Marsh,* INVENTOR

UNITED STATES PATENT OFFICE.

WILLIS L. MARSH, OF ST. LOUIS, MISSOURI.

PASTE-APPLYING APPARATUS.

No. 833,747.      Specification of Letters Patent.      Patented Oct. 23, 1906.

Application filed March 31, 1906. Serial No. 309,208.

*To all whom it may concern:*

Be it known that I, WILLIS L. MARSH, a citizen of the United States, residing at St. Louis, in the county of St. Louis and State of Missouri, have invented a new and useful Paste-Applying Apparatus, of which the following is a specification.

This invention relates to paste-applying apparatus of that type which include endless paste-carrying belts, and has for its object to provide for effectually and uniformly applying paste to the belt and to effectually remove the paste from the belt preparatory to its return to the paste-receptacle, whereby the paste upon the active face of the belt is maintained in a clean and thoroughly-satisfactory condition. It is furthermore designed to mount the belt so as to give access therefrom from its opposite edges and to effectually maintain the belt under the desired tension.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of advantages of the invention.

In the drawings, Figure 1 is a plan view of a paste-applying apparatus embodying the features of the present invention. Fig. 2 is a longitudinal sectional view thereof. Fig. 3 is an end view.

Like characters of reference designate corresponding parts in all of the figures of the drawings.

The supporting-frame of the present apparatus is preferably in the nature of a table 1, over which travels an endless belt 2, the upper ply of which is designed to carry paste, so as to be accessible from opposite edges of the belt, whereby the operatives may stand or sit on opposite sides of the table. For the support of the upper ply of the belt there is a series of rollers 3 disposed between the top and bottom plies of the belt and journaled in suitable bearings, preferably a pair of substantially parallel rails 4, suitably secured to the top of the table and projecting at opposite ends thereof. The width of the belt of course is somewhat less than the width of the table in order that there may be a convenient support for the pieces of material to which the paste is to be applied.

At one end of the table there is a paste-receptacle 5, which is suitably hung from the adjacent projecting end portion of the sill and is open at its top, so as to give access of the lower ply of the belt to a rotary paste-brush 6, mounted within the paste-receptacle. The outer side of the receptacle rises a suitable distance above the open top thereof, as shown at 7, and has a downwardly and inwardly inclined flange 8, upon which is a scraper 9, adjustable toward and away from the belt, so as to scrape therefrom excess paste. As best indicated in Fig. 1 of the drawings, it will be seen that the scraper-blade 9 is provided with a pair of transverse slots 10, through which project threaded pins rising from the flange 8 and provided with winged nuts 11, so as to rigidly secure the scraper when it has been adjusted to any desired position. At the other end of the table the belt hangs down in the form of a loop $2^a$, with its upper ply passing down and around a drive-roller 12. Below and set inward from the drive-roller 12 there is a drive-roller 15, over which the return portion of the looped part of the belt passes. For the purpose of maintaining the belt in the desired taut condition there is a belt-tightening device, including a weighted roller 16, carried by a vertical frame made up of uprights 17, each of which is provided with a longitudinal slot 18, receiving a pin or projection 19, extending inwardly from an arm 20, rigidly carried by the table below the top thereof and projecting beyond the adjacent end of the table. It will thus be understood that the weight of the roller 16 is supported solely by the looped portion $2^a$ of the belt, wherefore the latter is maintained in a tight condition.

It is proposed to scrape the residue portion of the paste from the belt before the latter is again subjected to the paste-receptacle, and this is accomplished by means of a scraper 21, which is formed by the upper inner edge of a receptacle 22, rigidly carried by a pair of arms 23, which extend outwardly from the frame members 17. The upper end of this receptacle is partially closed by a top 24, which terminates short of the inner upper edge of the receptacle, and said inner upper edge is bowed or inclined outwardly into contact with the adjacent ply of the belt, so as to scrape the paste therefrom and direct the same into the receptacle.

In practice the belt is set in operation and takes up paste from the roller 6, and the operatives apply the pieces of fabric or other material to the paste-surface of the belt by a quick movement of the hand, and then the pieces of material are quickly removed with a suitable quantity of paste adhering thereto. The application of pieces of material to the belt not only removes paste therefrom, but nap and the like adheres to the paste-surface of the belt, wherefore it becomes necessary to remove the residue of paste and nap from the belt before the latter is again subjected to the paste-roller. For driving the apparatus a drive-pulley 13 is carried by one of the journals of the roller 3, which is directly above the paste-brush 6 and is engaged by a suitable drive-belt 14. In employing the term "brush" for the member 6 it is intended that this term will cover any character of rotary element for applying paste to the belt—such, for instance, as a cylinder or corrugated roll.

Having thus described the invention, what is claimed is—

1. A pasting apparatus comprising a table, an endless belt of less width than the table traveling across the same and hung in a loop at one end thereof, means for applying paste to the belt, and a scraper engaging the looped portion of the belt.

2. A pasting apparatus comprising an endless belt, means for applying paste to the belt, work-supports extending along opposite edges of the belt, and a paste-receiving receptacle opened at the top and provided with a scraper adapted to engage said belt.

3. A pasting apparatus comprising a table, a pair of substantially parallel rails carried by the table and projecting beyond opposite ends thereof, antifriction-rollers carried by the rails, an endless belt traveling over the rails, paste-applying means carried by the rails beyond one end of the table, and a belt-tightener carried by the rails beyond the other end of the table.

4. A paste-applying apparatus comprising a table, substantially parallel rails upon the table and projecting at opposite ends thereof, antifriction-rollers journaled upon the rails, an endless belt traveling over the rollers, a paste-applying device carried by the rails beyond one end of the table, and a scraper carried by the rails beyond the other end of the table.

5. A paste-applying device comprising a table, a pair of substantially parallel rails upon the table and projecting at one end thereof, antifriction-rollers journaled on the rails, an endless belt traveling over the rails, an open-topped paste-receptacle carried by the projecting ends of the rails, a rotary paste-brush mounted in the receptacle in frictional engagement with the belt, and a scraper carried by the top of the receptacle.

6. A paste-applying apparatus comprising a table, an endless belt traveling over the table and hung in a loop at one end thereof, a belt-tightener including a roller engaging the looped portion of the belt, and means for applying paste to the belt.

7. A paste-applying apparatus comprising a table, an endless belt traveling over the table and hung in a loop at one end thereof, a pair of arms projecting beyond the table at opposite edges of the looped portion of the belt, a freely-movable frame supported by and mounted to move vertically upon the arms, and a roller carried by the frame and received within the bottom of the looped portion of the belt to form a belt-tightener.

8. A paste-applying apparatus comprising a supporting-frame, an endless belt traveling over the frame and hung in a loop at one end thereof, means for applying paste to the belt, and a scraper engaging the looped portion of the belt.

9. A paste-applying apparatus comprising a supporting-frame, an endless belt traveling over the frame and hung in a loop at one end thereof, means for applying paste to the belt, and a paste-receiving receptacle open at its top and provided with a scraper engaging the looped portion of the belt.

10. A paste-applying apparatus comprising a support, an endless belt traveling over the support and hung in a loop at one end thereof, means for applying paste to the belt, a belt-tightener including a gravity-frame mounted upon one end of the support and including a roller embraced by the looped portion of the belt, and a scraper carried by the gravity-frame.

11. In a paste-applying apparatus, the combination with a table, of spaced substantially parallel rails upon the top of the table and projecting beyond opposite ends thereof, antifriction-rollers journaled upon the rails, an endless belt traveling over the rollers and hung in a loop at one end of the table, arms carried by the table and embracing the looped portion of the belt, a gravity-frame hung from the arms and carrying a roller embraced by the looped portion of the belt, a paste-receiving receptacle carried by the frame and having a scraper engaging the belt, a paste-receptacle carried by the projecting ends of the rails at the other end of the table, a rotary paste-brush mounted in the receptacle and engaging the belt, and a scraper carried by the paste-receptacle.

In testimony that I claim the foregoing as my own I have hereto affixed my signature in the presence of two witnesses.

WILLIS L. MARSH.

Witnesses:
 FRANK O. NICHOLS,
 LOUISE W. NICHOLS.